RANDOM NOISE GENERATOR HAVING A CAPSULE THAT IS MECHANICALLY DISPLACED FROM ITS NORMAL LOCUS
Filed Aug. 22, 1969
Fig. 2
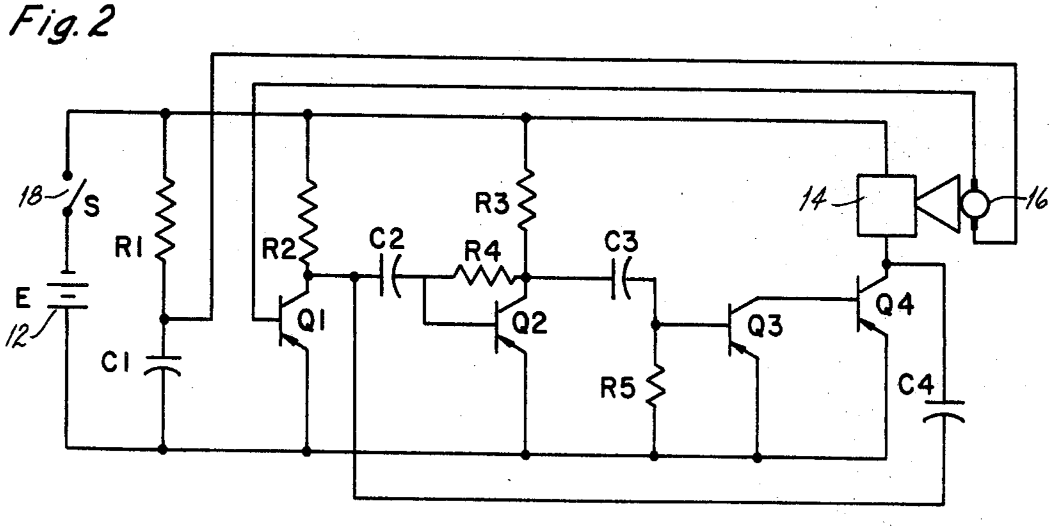
Fig. 3
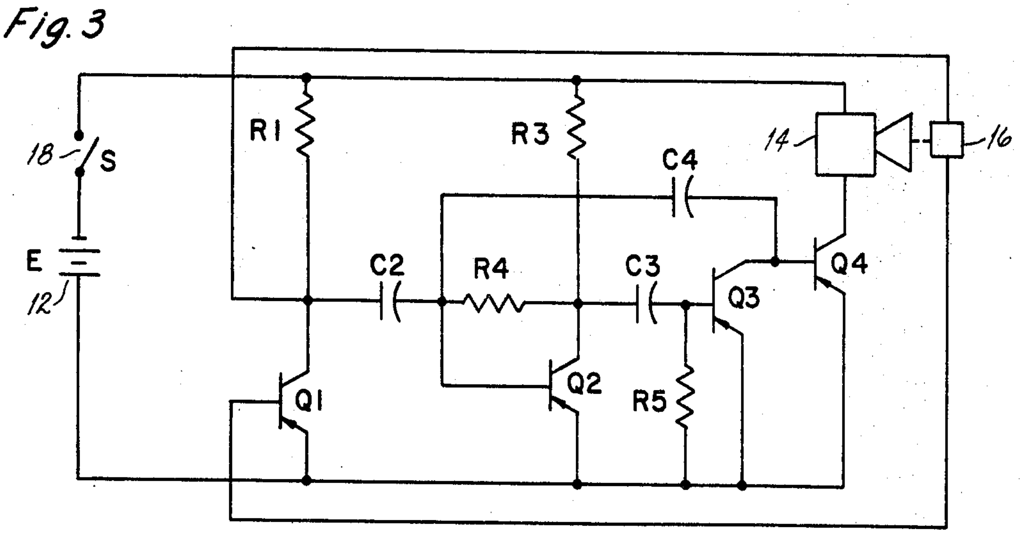
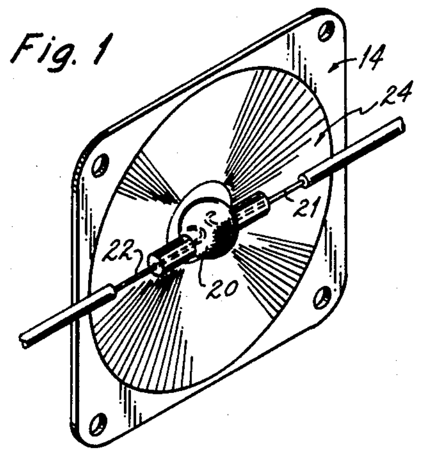
INVENTORS
ROBERT W. AUSBAND
ANARGAROS J. TSATAROS
BY
Stefan M. Stein
ATTORNEY United States Patent Office 3,534,363
Patented Oct. 13, 1970

3,534,363
RANDOM NOISE GENERATOR HAVING A CAPSULE THAT IS MECHANICALLY DISPLACED FROM ITS NORMAL LOCUS

Robert W. Ausband, Rte. 1, Box 99, Palm Harbor, Fla. 33563, and Anargaros J. Tsataros, 410 Hope St., Tarpon Springs, Fla. 33589
Filed Aug. 22, 1969, Ser. No. 852,340
Int. Cl. G08b *3/10*
U.S. Cl. 340—384 8 Claims

ABSTRACT OF THE DISCLOSURE

A random noise generator which includes, generally, a speaker, a mechanically agitated element in the vicinity of the speaker, amplifier means drivingly coupled to the speaker, and a feedback circuit coupling the output of the mechanically agitated element to the input of the amplifier means. The mechanically agitated element generates random noise currents which are coupled to the amplifier means, amplified and used to drive the speaker which, in turn, produces the sound and causes continued agitation of the mechanically agitated element.

This invention relates, in general, to noise generators and, in particular, to random noise generators which can be used to simulate may different sounds such as the sound of a jet airplane, a bee, a siren, a bullet, a motor, etc.

There are many noise generators presently available, but all are relatively complex, sophisticated type devices. They also usually are of large size, and in all instances, are relatively expensive to build and to maintain.

There are many instances where it is desirable to reproduce a particular sound. In riding bicycles, children enjoy duplicating the sound of a motorcycle or an automobile or a police cruiser. Radio and television stations have a need for reproducing environmental sounds such as the Green Hornet, a police siren, a bumblebee, a wailing banshee, etc. Theaters frequently have a similar requirement. Reproduction of sound is also frequently desirable for advertising purposes. Yet, the above needs have not been satisfied by an inexpensive, random noise generator.

Accordingly, an object of this invention is to provide a novel random noise generator.

Another object is to provide a noise generator of the above character for producing a variety of audible noises.

Still another object is to provide a noise generator of the above character which is simple in design and inexpensive, in comparison to presently available noise generators.

A further object is to provide a noise generator of the above character which can be easily and quickly adjusted to provide different noises or sounds.

Another object is to provide a noise generator of the above character which can be used with battery or with generator derived electrical power.

Another object is to provide a noise generator of the above character capable of being used in a toy.

Other objects of the invention will in part be obvious and will in part appear hereinafter.

The above objectives are accomplished with a device which includes, generally, a speaker, a mechanically agitated element in the vicinity of the speaker, amplifier means drivingly coupled to the speaker, and a feedback circuit coupling the output of the mechanically agitated element to the input of the amplifier means. The mechanically agitated element generates random noise currents which are coupled to the amplifier means, amplified and used to drive the speaker, The speaker, in turn, produces the sound (within the audible or beyond the audible spectrum range) and causes continued agitation of the mechanically agitated element. The resulting noise or sound can be varied, by changing the degree of packing of the mechanically agitated element and/or the material used and/or the shape of the leads extending into the material.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a perspective view illustrating the manner in which the mechanically agitated element of the random noise generator is affixed to the speaker.

FIG. 2 is a schematic diagram of one embodiment of a circuit for use with the mechanically agitated element.

FIG. 3 is a schematic diagram of a second embodiment of a circuit for use with said element.

Similar reference characters refer to similar parts throughout the several views of the drawing.

Referring now to the drawing, in FIGS. 2 and 3 there is shown a schematic diagram of a random noise generator including, generally, a source of power 12, which may be a battery or a generator current source, a speaker 14, amplifier means drivingly coupled to said speaker and a mechanically agitated element 16.

The speaker 14 can be of any standard type which is of a size and has an output capable of driving the mechanically agitated element 16, in the manner described below.

The mechanical agitated element 16 and the speaker is shown in FIG. 1. The element includes a capsule 20 or other similar container means which is filled or packed with a material having changeable or variable resistive characteristics. Granulated carbon material preferably is used, however, other materials such as graphite, iron, aluminum, steel, brass, nickel, tin, lead, Nichrome, manganese, zinc, tungsten, copper, silver, gold platinum and mercury, in granulated form, can be used also. Leads 21 and 22, the inner shape of which also effect the noise generated, are affixed to the capsule 20 or, more specifically, the material therein, to provide a means for coupling the element 16 into the circuitry of the noise generator 10. A hook shape (as shown), a straight end, a plate-like end and the like for the inner end of the lead may be used.

The mechanically agitated element 16 preferably is placed in the vicinity of the speaker 14 so as to be caused to vibrate to continue the agitation of the element 16.

In the embodiment shown in FIG. 2, the amplifier means comprises a three stage amplifier including transistors Q1, Q2 and Q3, and an emitter follower output transistor Q4, and a switch 18 for controlling the energization of the generator. More specifically, the circuit shown in FIG. 2 includes three transistors Q1, Q2 and Q3 which are biased by means of resistors R1, R2, R3, R4 and R5 and a capacitor C1 and are coupled together by means of capacitors C2 and C3, so as to provide a three gain stage amplifier. The output of the third stage, transistor Q3, is coupled to a transistor Q4 which is, in turn, connected as an emitter follower to drive the speaker 14. A capacitor C4 coupled between the input to the speaker 14 and the input to transistor Q2 provides a regenerative feedback to produce whistling oscillations, if desired.

In FIG. 2, the transistors Q1, Q2 and Q3 are again coupled to provide a three gain stage amplifier, however, in this case, additional feedback is provided between the different amplifier stages, so as to provide greater amplification. Also, the mechanically agitated element 16 is illustrated as being affixed in the near vicinity of the speaker cone 24, rather than directly to it, as in the case of FIG. 1. The element 16 is coupled to the input of transistor A1, and the capsule 20 preferably is affixed to the speaker cone 24 of the speaker 14, as illustrated in FIG. 1, so that the mechanical vibrations of the speaker cone 24 function to vibrate or agitate the material in the capsule. The resistance of the material changes or varies as it is agitated and thereby produces random noise currents which are coupled as an input to the transistor Q1. The capsule 20, however, only need be in the vicinity of the speaker 14 or the speaker cone 24 so that it is vibrated or agitated in the described fashion. Alternatively, means can be provided to physically vibrate it, if desired.

If desired, a capacitor C4 can be coupled between the output of transistor Q4 and the input to transistor Q3, to provide a slight regenerative feedback to produce whistling oscillations.

It should be evident from the above that the noise generator of the invention is relatively simple in design and can be compactly packaged so that it can be easily fitted into a toy such as a model airplane, car or the like.

Upon closing the switch 18, the mechanically agitated element 16 is coused to vibrate generally by the inherent noise in the circuitry and the speaker 14 to cause the material in the capsule 20 to be agitated so as to produce the random noise currents which are coupled to the input of transistor Q1. A regenerative type action results, causing the intensity of the noise or sound output of the speaker 14 to progressively increase.

As stated, the frequency of the noise produced can be varied by changing the power supplied to the noise generator and/or by changing the degree of packing of the material, that is, by loosely or tightly packing the material, in the capsule 20 or by varying the shape of the leads into the material. Noises simulating a jet airplane, the Green Hornet (a trademarked radio and television program), a bee, a rifle shot, as well as a number of other audible noises can be generated.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A random noise generator comprising, in combination: a speaker; amplifier means drivingly coupled to said speaker; a source of power for said amplifier means; and a mechanical agitated element including a capsule with a material having variable resistive characteristics therein, said material within said capsule being coupled to the input of said amplifier means via leads extending therein and being vibrated to thereby produce random noise currents which are coupled to the input of said amplifier means, amplified and coupled to said speaker.

2. The random noise generator of claim 1, wherein said capsule is located in the near vicinity of said speaker so as to be vibrated by the speaker output.

3. The random noise generator of claim 1, wherein said capsule is affixed to the speaker cone of said speaker and mechanically vibrated by said speaker cone during the operation of said speaker.

4. The random noise generator of claim 1, wherein said material comprises granulated carbon.

5. The random noise generator of claim 1, wherein the inner ends of the leads into said capsule have a hook shape.

6. The random noise generator of claim 1, wherein said source of power comprises a battery.

7. The random noise generator of claim 1, wherein said source of power comprises a generator.

8. The random noise generator of claim 1, further including capacitor means coupled between the input to said speaker and to said amplifier means to provide a regenerative feedback to produce whistling oscillations at the output of said speaker.

References Cited

UNITED STATES PATENTS 2,400,309 10/1941 Kock.

HAROLD I. PITTS, Primary Examiner

U.S. Cl. X.R.

340—148, 227, 261, 388